United States Patent [19]

Skurikhin et al.

[11] 4,246,470
[45] Jan. 20, 1981

[54] DIGITAL DEVICE FOR CHECKING STEADY-STATE VALUE OF ANALOGUE SIGNAL

[76] Inventors: Vladimir I. Skurikhin, ulitsa Chkalova, 41-a, kv. 18; Leonid S. Fainzilberg, ulitsa Saratovskaya, 18/16, kv. 8; Leonid S. Zhitetsky, prospekt Vernadskogo, 61, kv. 8/4, all of Kiev, U.S.S.R.

[21] Appl. No.: 964,070

[22] Filed: Nov. 27, 1978

[51] Int. Cl.³ .................... G06M 3/14; G01N 25/04
[52] U.S. Cl. .................... 235/92 PB; 235/92 CV; 364/472
[58] Field of Search ........ 235/92 MT, 92 EV, 92 TF, 235/92 CC, 92 PB, 92 CV; 364/472

[56] References Cited

U.S. PATENT DOCUMENTS

| | | | |
|---|---|---|---|
| 3,860,798 | 1/1975 | Kemper | 235/92 PB |
| 3,895,377 | 7/1975 | Schwalenstocker | 235/92 CV |
| 4,088,974 | 5/1978 | Zhitetsky et al. | 364/472 |
| 4,165,508 | 8/1979 | Barter | 235/92 CV |

FOREIGN PATENT DOCUMENTS 1477564  6/1977  United Kingdom .

*Primary Examiner*—Joseph M. Thesz
*Attorney, Agent, or Firm*—Haseltine and Lake

[57] ABSTRACT

A digital device for determining a steady-state value of the analogue signal, comprising an analog-to-digital converter for converting the analogue signal into a numerical pulse code, electrically connected, through a synchronization unit, to inputs of threshold counters, a clock pulse generator electrically connected, through the synchronization unit, to the inputs of the threshold counters and to those of the time interval discriminator, and, through the frequency halver, electrically connected to the inputs of a reversible counter, a digital display unit electrically connected to the digit outputs of the reversible counter. The device also comprises decoders of zero state of the threshold counters, having their inputs respectively connected thereto and their outputs electrically connected to subtract count blocking inputs of the respective threshold counters, to the inputs of the reversible counter and to a control input of the digital display unit. Overflow outputs of the threshold counters are connected to initial setting inputs of the time interval discriminator. An information output of the time interval discriminator is electrically connected to the input, thereof, to the inputs of the threshold counters, to those of the reversible counter and to the control input of the digital display unit. In addition, the device includes seven AND circuits and three NOT circuits by means of which a logical control of electric communication between said units of the device is effected.

1 Claim, 4 Drawing Figures

DIGITAL DEVICE FOR CHECKING STEADY-STATE VALUE OF ANALOGUE SIGNAL

FIELD OF THE INVENTION

The present invention relates to digital computor technique, and, in particular, to digital devices for determining a steady-state value of the analogue signal.

The present invention can be employed for preliminary processing of information received from sensors during production processes, and, more particularly, for digit representation of the molten steel temperature measured by means of an immersion thermocouple.

BACKGROUND OF THE INVENTION

In preliminary processing of information there exists a type of problems to estimate against a noise background, a steady-state value with a final result to be represented in a digital form.

A problem of such a type exist in measuring temperature of molten metal, for example steel, by means of a temperature sensor which is immersed in the melt for a short period of time, when it is required to determine in a digital form the signal value received from the sensor, which is set after termination of a transient process caused by the drift of temperature sensors.

Known in the art is a digital computing device designed for checking parameters of a molten metal. (See British Accepted Application No. 1477564). The above device can be employed for determining in a digital form a steady-state value of the analogue signal, for example, for determining a molten metal temperature measured by means of an immersion thermocouple.

Said device comprises an analogue-to-digital converter for converting an analogue signal into a numerical pulse code, having an output of code pulses corresponding to a positive increment of the analogue signal and an output of code pulses corresponding to a negative increment of the analogue signal, a clock pulse generator, a synchronization unit for distribution in time of code and clock pulses, connected with the inputs and outputs of the analogue-to-digital converter and to an output of the clock pulse generator. For determining local increments of the analogue signal there are provided a first and a second threshold counter, the digit outputs of which are connected to inputs of decoders of the zero state of threshold counters, outputs of said decoders being connected to subtract count blocking inputs of the respective threshold counters. The device also comprises a time interval discriminator designed for selecting time intervals between sequence instants of time when a local increment of the analogue signal assumes a predetermined value. Initial setting inputs of the time interval discriminator are connected to overflow outputs of said threshold counters. An output of synchronized clock pulses of the synchronization unit is electrically connected to a count input of the time interval discriminator. Synchronized code pulse outputs of the synchronization unit are electrically connected to the threshold counters and to a reversible counter designed for generating a parallel code of the result. A register connected with its information input to digit outputs of the reversible counter, and with its control input to the output of the time interval discriminator provides for a storage of the computed result which is displayed in a digital form in a digital display unit.

During the process of determining temperature of molten metal, in the reversible counter there is formed a code proportional to the current readings of the analogue signal received from the temperature sensor. If positive or negative increments of the signal exceeds a predetermined threshold $\Sigma_o$ of non-sensitivity to the signal deviations from its steady-state value, caused by interference effect, there appear pulses at the overflow outputs of the threshold counters. Each such pulse sets into the initial state the time interval discriminator which counts up a number of synchronized clock pulses. If within a predetermined time interval $\tau_o$ set with the aid of the time interval discriminator, an increment of the signal does not exceed the predetermined threshold $\Sigma_o$, there appears a signal at the output of the time interval discriminator, which indicates that the analogue signal has assumed its steady-state value. The parallel code contained in this instant of time in the reversible counter enables said ready-state value of the analogue signal to be estimated. The signal, which is fed to the control input of the register from the output of the time interval discriminator, contains information indicative of the steady-state value of the analogue signal.

It should be noted that the parallel code fed to the register may vary from the code of the steady-state value of the analogue signal by a value of $\pm 0.5\ \Sigma_o$. Thus, the maximum error in determining a steady-state value of the analogue signal with the aid of the above device cannot be less than 0.5 $\Sigma_o$.

With the increase of the noise level the non-sensitivity threshold $\Sigma_o$ has to be increased, which brings about an increase in the maximum error in determining the ready-state value of the analogue signal. Thus, an accuracy in determining the steady-state value of the analogue signal by means of the above device considerably depends on the noise level.

For example, when determining molten steel temperature is done by means of the existing temperature sensors, which are dipped in the melt for a short period of time, the noise level may be equivalent to the deviation of the analogue signal value in the order of 10° C. This being the case, the threshold $\Sigma_o$ of non-sensitivity has to be equal to 10° C. which may cause an error in determining molten steel temperature within ±5° C. In smelting and casting a high-quality steel such an error in determining its temperature is not permissible.

SUMMARY OF THE INVENTION

The principal object of this invention is to provide a digital device incorporating simple elements and units of the digital-computing technique for determining a steady-state value of the analogue signal, enabling said steady-state value of the analogue signal to be determined as the average of the maximum and minimum values of the analogue signal variations of which within a preset time interval do not exceed a predetermined value.

Another object of the invention is to provide such a digital device for determining a steady-state value of the analogue signal, error of which does not depend on the noise level.

Yet another object of the invention is to improve an accuracy in determining a steady-state value of the analogue signal.

These and other objects of the invention are accomplished by providing a digital device for determining a steady-state value of the analogue signal, comprising an analogue-to-digital converter for converting an analogue signal into a numerical pulse code, having an output of code pulses corresponding to a positive increment of the analogue signal, and an output of code pulses corresponding to a negative increment of the analogue signal, a clock pulse generator, a reversible counter for generating a parallel code of the computed result, a digital display unit for displaying the calculated result, electrically connected to digit outputs of said reversible counter, a first and a second threshold counters for determining local increments of the analogue signal, decoders of the zero state of the first and second threshold counters, said decoders being connected with their inputs to digit outputs of said threshold counters and with their outputs to subtract counting blocking inputs of said first and second threshold counters, a time interval discriminator for selecting intervals between two sequence instants of time when a local increment of said analogue signal assumes its predetermined value initial setting inputs of said discriminator being connected to overflow outputs of said threshold counters, a synchronization unit for time distribution of code and clock pulses, connected with its two inputs to outputs of said analog-to-digital converter and with its third input to the output of a clock pulse generator, outputs of synchronized code pulses of said synchronizer unit being electrically connected to said threshold counters and said reversible counter, whereas the output of synchronized clock pulses of said synchronization unit being electrically connected to said discriminator of time intervals, said digital device has, according to the invention, a frequency halver, three NOT circuits, seven AND circuits, and wherein time interval discriminator which is provided with an information output connected to first outputs of a first, second, third, fourth AND circuit, and through a first NOT circuit to a first input of a fifth AND circuit, an output of synchronized clock pulses of said synchronization unit is connected to a second input of said first AND circuit, the threshold counters are provided with additional subtract inputs whereto there is connected an output of said first AND circuit, synchronized code pulse outputs of said synchronization unit are electrically connected to said threshold counters and said reversible counter through a sixth and a seventh AND circuit respectively, the output of synchronized code pulses corresponding to a positive increment of the analogue signal, being connected to a first input of the sixth AND circuit whereas the output of synchronized code pulses corresponding to a negative increment of the analogue signal, being connected to a first input of the seventh AND circuit, second inputs of the sixth and seventh AND circuits are combined with the first input of the fifth AND circuit whereas the output of the sixth AND circuit is connected to add inputs of said reversible counter and said first threshold counter and to a subtract input of the second threshold counter, an output of the seventh AND circuit is connected to subtract inputs of said reversible counter and said first threshold counter and to the add input of said second threshold counter, an output of synchronized clock pulses of the synchronization unit is electrically connected to said time interval discriminator through the fifth AND circuit, said output of said synchronization unit being connected to the second input of said fifth AND circuit the output of which is connected to a count input of said time interval discriminator, second inputs of the second and third AND circuits are connected to said output of synchronized clock pulses of said synchronization unit through a frequency halver, an output of the decoder of zero-state of said first threshold counter is connected to a third input of the third AND circuit, to a second input of the fourth AND circuit, and, through a second NOT circuit, to a third input of the second AND circuit, an output of the decoder of zero state of the second threshold counter is connected to a fourth input of the second AND circuit, to a third input of the fourth AND circuit, and, through said third NOT circuit, to a fourth input of the third AND circuit, outputs of the second and third AND circuits are connected to an additional subtract input and to an additional add input of the reversible counter, a digital display unit is provided with a control input connected to an output of the fourth AND circuit.

These and other objects and advantages of the present invention will become evident from the following specification and accompanying drawings, wherein:

DETAILED DESCRIPTION OF THE INVENTION

Figure 1:
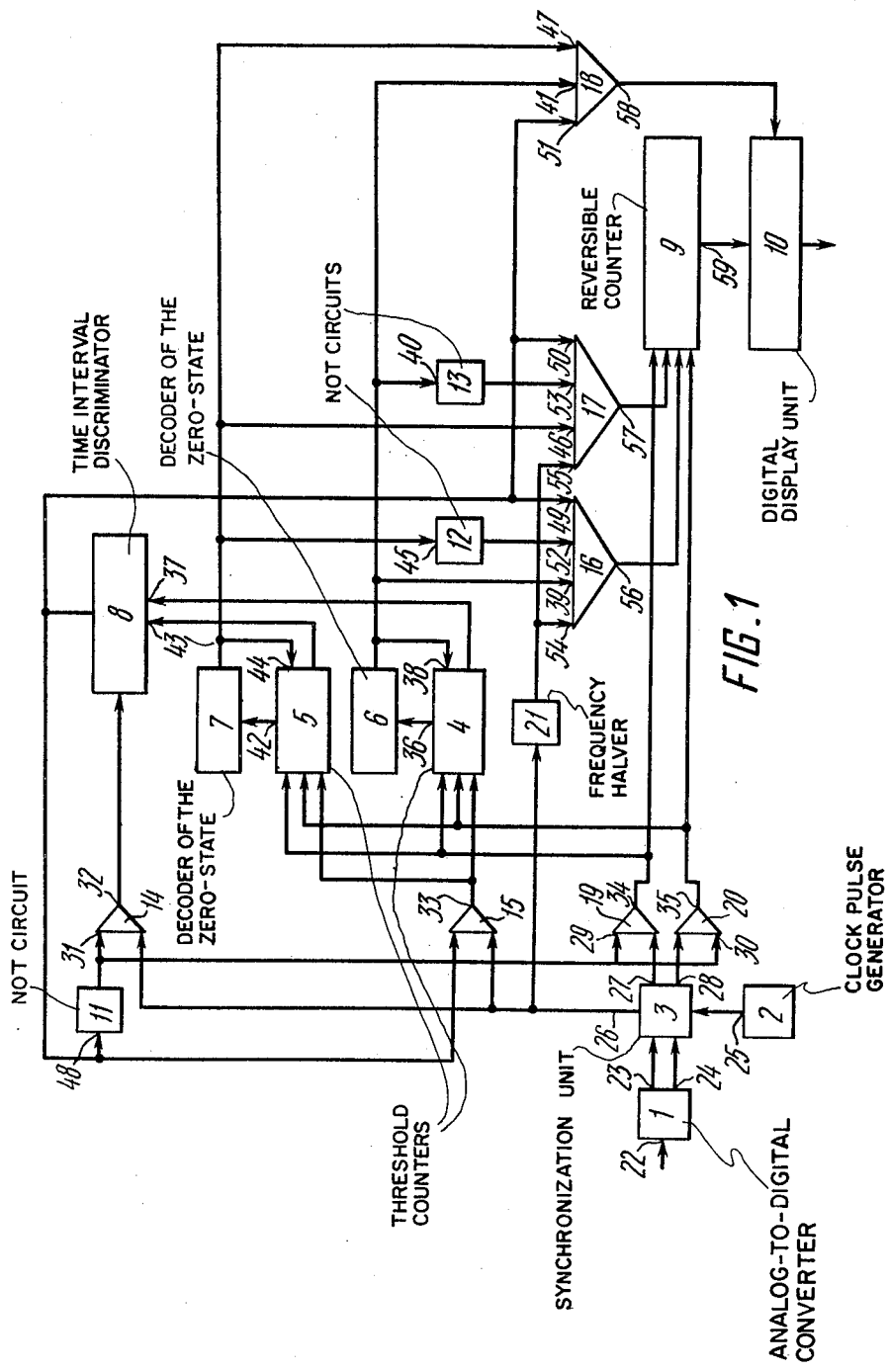
FIG. 1 is a block diagram of the digital device for determining a steady-state value of the analogue signal in accordance with the invention.

A digital device for determining a steady-state value of the analogue signal as illustrated in FIG. 1, comprises an analogue-to-digital converter 1 for converting an analogue signal into a numerical pulse code, a clock pulse generator 2, a synchronization unit 3 for distribution in time of code and clock pulses, threshold counters 4, 5, a decoder 6 of the zero-state of the threshold counter 4, a decoder 7 of the zero-state of the threshold counter 5, a time interval discriminator 8, a reversible counter 9, a digital display unit 10, three NOT circuits 11, 12, 13, seven AND circuits 14, 15, 16, 17, 18, 19, 20, and a frequency halver 21.

The converter 1 of analogue signal into numerical pulse code has an input 22, an output 23 for transmitting code pulses corresponding to a positive increment of the analogue signal, and an output 24 for transmitting code pulses corresponding to a negative increment of the analogue signal. The outputs 23 and 24 are connected to the synchronization unit 3. An output 25 of the clock pulse generator 2 is also connected to the synchronization unit 3. An output 26 of synchronized clock pulses of the synchronization unit 3 is connected to an input of the AND circuit 14, to an input of the AND circuit 15 and to an input of the frequency halver 21. An output 27 of the synchronization unit 3, intended for transmitting synchronized code pulses corresponding to a positive increment of the analogue signal at the input 22 of the converter 1, is connected to an input of the AND circuit 19. An output 28 of the synchronization unit 3, intended for transmitting synchronized code pulses corresponding to a negative increment of the analogue signal at the input 22 of the converter 1, is connected to an input of the AND circuit 20. Inputs 29, 30, 31 of the respective AND circuits 20, 19, 14 are combined. An output 32 of the AND circuit 14 is connected to a count input of the time interval discriminator 8. An output 33 of the AND circuit 15 is connected to additional subtract inputs of the threshold counters 4, 5. An output 34 of the AND circuit 19 is connected to an add input of the threshold counter 5, to a subtract input of the threshold counter 4 and to an add input of the reversible counter 9. An output 35 of the AND circuit 20 is connected to a subtract input of the threshold counter 5, to an add input of the threshold counter 4 and to a subtract input of the reversible counter 9. Digit outputs 36 of the threshold counter 4 are connected to the outputs of the decoder 6. An overflow output of the threshold counter 4 is connected to an initial setting input 37 of the time interval discriminator 8. An output of the decoder 6 is connected to an input 38 of subtract count blocking of the threshold counter 4, to an input 39 of the AND circuit 16, to an input 40 of the NOT circuit 13 and to an input 41 of the AND circuit 18. Digit outputs 42 of the threshold counter 5 are connected to inputs of the decoder 7. An overflow input of the threshold counter 5 is connected to an input 43 of initial setting of the time interval discriminator 8. An output of the decoder 7 is connected to an input 44 of subtract count blocking of the threshold counter 5, to an input 45 of the NOT circuit 12, to an input 46 of the AND circuit 17 and to an input 47 of the AND circuit 18. An information output of the time interval discriminator 8 is connected to an input 48 of the NOT circuit 11 and to inputs 49, 50, 51 of the AND circuits 16, 17, and 18, respectively. An output of the NOT circuit 11 is connected to the input 31 of AND circuit 14, an output of the NOT circuit 12 is connected to an input 52 of the NOT circuit 16 and an output of the NOT circuit 13 is connected to an input 53 of the AND circuit 17. An output of the frequency halver 21 is connected to inputs 54, 55 of the AND circuits 16 and 17, respectively. An output 56 of the AND circuit 16 is connected to an additional subtract input of the reversible counter 9 whereas an output 57 of the AND circuit 17 being connected to an additional add input of the reversible counter 9. An output 58 of the AND circuit 18 is connected to a control input of the digital display unit 10. Digit outputs 59 of the reversible counter 9 are connected to an information input of the digital display unit 10.

The threshold counters 4, 5 are scaling circuits set to a scaling factor corresponding to a predetermined threshold $\Sigma_o$ of non-sensitivity to the signal deviations from a steady-state value, caused by interference.

The time interval discriminator 8 is a scaling circuit whose scaling factor corresponds to a duration of the predetermined time interval.

The foregoing digital device for determining the steady-state value of the analogue signal functions as follows. The analogue signal is fed to the input 22 of the converter 1 of the analogue signal into a numerical pulse code. Depending on the increment sign of the analogue signal, code pulses are formed either at the output 23 or at the output 24 of the analogue-to-digital converter 1 for converting the analogue signal into a numerical pulse code, the number of the code pulses being proportional to the increment of the analogue signal. The code pulses from the outputs 23 and 24 are fed to the first and second inputs of the synchronization unit 3, while to the third input of the synchronization unit 3 are fed clock pulses from the output 25 of the clock pulse generator 2. In the synchronization unit 3 the code and clock pulses are distributed in time. The synchronized code and clock pulses are formed at the inputs 26, 27 and the output 28 of the synchronization unit 3, respectively.

At the moment of starting the device, the time interval discriminator 8 is set in its initial state either with the initial setting key (not shown) or automatically, in response to which blocking potential is formed at the information output of the time interval discriminator 8, which blocks the AND circuits 15, 16, 17 and 18, and opens, through the NOT circuit 11, the AND circuits 14, 19 and 20.

From the synchronization unit 3 the synchronized code pulses are fed, through the released AND circuits 19, 20, either to the add input or to the subtract input of the reversible counter 9 to generate a parallel code of the analogue signal current value. The same code pulses are fed to the add and subtract inputs of the threshold counters 4, 5. In this case, if an increment of the analogue signal is positive, the code pulses from the output 34 of the AND circuit 19 are fed to the add input of the reversible counter 5 and the subtract input of the threshold counter 4. In case the increment of the analogue signal is negative, the code pulses from the output 35 of the AND circuit 20 are applied to the subtract input of the reversible counter 9, the subtract input of the threshold counter 5 and at the add input of the threshold counter 4. If in the threshold counter 4 a zero is formed, a further subtract counting in said counter is blocked by the decoder 6. Similarly, if a zero is formed in the threshold counter 5, a further subtract counting in this counter is blocked by the decoder 7. Thus, the threshold counter 5 generates a code proportional to a local positive increment of the analogue signal relative to the local minimum of the variation curve of said signal, whereas threshold counter 4 generates a code proportional to a local negative increment of the analogue signal relative to the local maximum on the variation curve of said signal. If either of said local increments exceeds a predetermined threshold $\Sigma_o$, at the overflow output of the respective threshold counter there is formed a pulse setting the time interval discriminator 8 in its initial state. The count input of the time interval discriminator 8 is fed with synchronized clock pulses through the AND circuit 14. A release voltage at the information output of the time interval discriminator 8 can be formed only if within a preset time interval $\tau_o$ said discriminator is not reset in its initial state by a pulse received from the overflow output of either of the threshold counters 4 or 5. Thus, as the analogue signal variates, the time interval discriminator 8 is set in its initial state each time when the increment of the analogue signal within a preset time interval $\tau_o$ exceeds $\Sigma_o$ value. When the analogue signal assumes its steady-state value, its negative and positive increments do not exceed $\Sigma_o$ value. As soon as the time interval $\tau_o$ calculated from the moment of the last initial resetting of the time interval discriminator 8 terminates at the information output of said discriminator there appears a release potential. In this case a blocking potential formed at the output of the NOT circuit 11 blocks the AND circuits 14, 19, 20, which in turn blocks passage of the code pulses to the reversible counter 9 and to the threshold counters 4 and 5. Simultaneously, feeding the clock pulses to the count input of the time interval discriminator 8 ceases due to which release potential at the information output thereof is maintained till the next cycle determining the steady-state value of the analogue signal. Also the permitting potential formed at the information output of the time interval discriminator 8, opens the AND circuit 15, and the synchronized clock pulses from the output 26 of the synchronization unit 3, are fed through said AND circuit 15, to the additional subtract inputs of the threshold counters 4 and 5.

Figure 2:
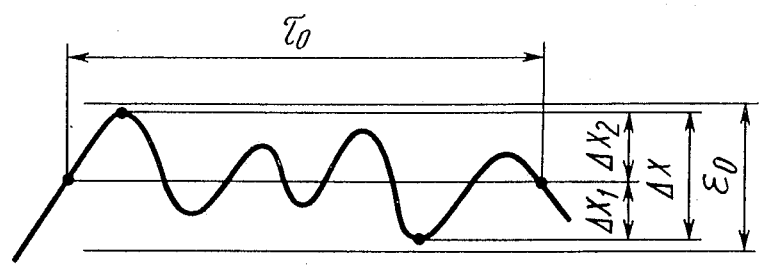
FIG. 2 illustrates a representative portion of the analogue signal variation curve for the case when the point of the representative portion of the curve, at which the time interval discriminator is triggered, is located on the midline between the maximum and minimum values of the analogue signal.

If a value of the analogue signal, at which the reversible counter 9 and the threshold counters 4 and 5 have been blocked by a signal of the time interval discriminator 8, is found midway between the maximum and minimum values of the analogue signal on the representative portion of the curve representing a time dependence of the analogue signal value (FIG. 2), the contents $\Delta X_1$ of the threshold counter 5 at the moment of blocking is equal to the contents $\Delta X_2$ of the threshold counter 4. Clock pulses, which are fed through the AND circuit 15 to the additional subtract inputs of the threshold counters 4 and 5, cause the contents of said threshold counters to vary. As soon as a zero is formed in said threshold counters, the decoders 6 and 7 of zero state of the threshold counters 4 and 5 block the subtract inputs of said counters simultaneously applying release potentials to the inputs 41 and 47 of the AND circuit 18. In so far as said circuit 18 is also fed through its input 51 with the release potential from the information output of the time interval discriminator 8, at its output 58 there is formed release potential which, being fed to the control input of the digital display unit 10, causes transmission of information from the reversible counter 9 to said digital display unit 10 wherein a steady-state value of the analogue signal is numerically displayed corresponding to the average between the maximum and minimum values of the analogue signal on said representative portion of the variation curve of said analogue signal.

Figure 3:
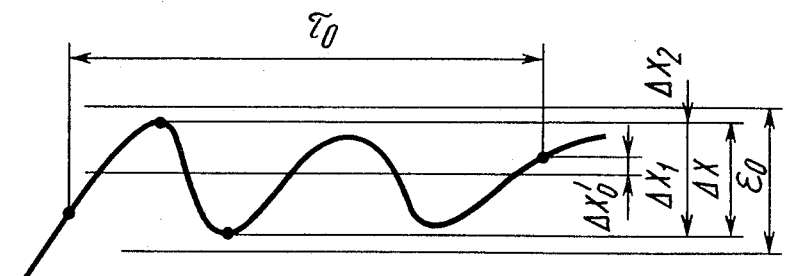
FIG. 3 illustrates substantially the same as in FIG. 2 but for the case when the point of the representative portion of the curve, at which the time interval discriminator is triggered, is located above the midline between the maximum and minimum values of the analogue signal.

If the point on the variation curve (FIG. 3) of the analogue signal, at which the reversible counter 9 has been blocked by a potential at the information output of the time interval discriminator 8, is located above the midline between the maximum and minimum values of the analogue signal on a representative portion of the curve, the contents $\Delta X_1$ of the threshold counter 5 at the moment of signal formation at the information output of the time interval discriminator 8 will be greater than the contents $\Delta X_2$ of the threshold counter 4, and the value $\Delta X_o'$ of the blocking point deviation relative to the midline between the maximum and minimum values of the analogue signal of the representative portion of the curve may be determined by relation $$X_o{}^{11}=(X_1-X_2)/2 \tag{1}$$

Synchronized clock pulses fed from the output 33 of the AND circuit 15 to the additional subtract inputs of the threshold counters 4 and 5 cause the contents of said threshold counters 4 and 5 to vary in a manner similar to above, however a zero is first formed in the threshold counter 4 while in the threshold counter 5 there is a code corresponding to the difference between values $\Delta X_1$ and $\Delta X_2$. At the moment, when a zero appears in the threshold counter 4, the decoder 6 of the zero-state thereof blocks the threshold counter 4 and sends release potentials to the AND circuits 16 and 18. The decoder 7 of the zero state of the threshold counter 5 sends through the NOT circuit 12 release potential to the input 52 of the AND circuit 16. In so far as at the input 49 of said AND circuit there also exists a release potential formed at the information output of the time interval discriminator 8, synchronized clock pulses, whose frequency is divided in two by the frequency halver 21, are fed through the AND circuit 16 to the additional subtract input of the reversible counter 9, said pulses being fed to said additional subtract input of the reversible counter 9 until a zero is formed in the threshold counter 5 as in the threshold counter 4. At this time release potential at the output of the decoder 7, passing through the NOT circuit 12 locks the AND circuit 16. The number of pulses being fed to the reversible counter 9 corresponds to the value $\Delta X_o'$ determined by the expression 1, which enables the contents of the reversible counter 9 to be corrected automatically to a required value corresponding to the average between the maximum and minimum values of the analogue signal on the representative portion of the curve. As soon as a zero appears in the threshold counter 5 the AND circuit 18 gets released so as to transmit information indicative of the steady-state value of the analogue signal to the digital display unit 10.

Figure 4:
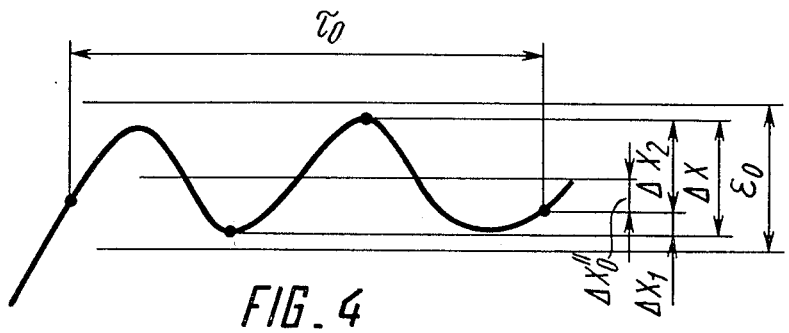
FIG. 4 illustrates the same as that in FIG. 2 but for the case when the point of the representative portion of the curve, at which the time interval discriminator is triggered, is located below the midline between the maximum and minimum values of the analogue signal.

In case the point, at which the reversible counter 9 has been blocked by a potential at the information output of the time interval discriminator 8, is located below the midline between the maximum and minimum values of the analogue signal on the representative portion of the curve (FIG. 4), the contents $\Delta X_1$ of the threshold counter 5 at the moment of signal formation at the information output of the time interval discriminator 8 will be smaller than the contents $\Delta X_2$ of the threshold counter 4. The value $\Delta X_o''$ of the blocking point deviation from the midline between the maximum and minimum values of the analogue signal on the representative portion of the curve, is determined by the following relation:

$$X_o{}^{11}=(X_2-X_1)/2 \tag{2}$$

Synchronized block pulses fed to the additional subtract inputs of the threshold counters 4 and 5 cause the contents thereof to vary. As soon as the zero is formed in the threshold counter 5, in the threshold counter 4 there will be a code corresponding to the difference between values $\Delta X_2$ and $\Delta X_1$. At this instant of time the decoder 7 blocks the subtract input of the threshold counter 5 and opens the AND circuit 17. Synchronized clock pulses are fed, through the frequency halver 21 and AND circuit 17 to the additional add input of the reversible counter 9, feeding said pulses to said additional add input of the reversible counter 9 being ceased when zero is formed in the threshold counter 4 as in the threshold counter 5. In this case the decoder 6 blocking the subtract input of the threshold counter 4 locks the AND circuit 17 through the NOT circuit 13. Simultaneously, said decoder 6 opens the AND circuit 18. Thus, the reversible counter 9 will be fed with a number of pulses corresponding to the value $\Delta X_o''$ determined by expression 2, which causes the contents of the reversible counter 9 to be automatically corrected to a required value corresponding to the point on the midline between the maximum and minimum values of the analogue signal on the representative portion of the curve. On signal received from the output 58 of the AND circuit 18 the corrected contents of the reversible counter 9 is transmitted to the digital display unit 10 to be numerically displayed therein.

The above design of a digital device for checking a steady-state value of the analogue signal enables said steady-state value of the analogue signal to be determined more accurately. In said device an error in determining the steady-state value of the analogue signal depends exclusively on the resolution ability of the converter of analogue signal into numerical pulse code and not on the noise level. The use of simple elements and units of digital-computing technique in the device ensures a high reliability, as well as a low cost and small dimensions thereof. The employment of said digital device for determining the steady-state value of the analogue signal, for example, for determining in the numerical form a temperature of the molten steel, measured by means of a thermocouple which is dipped in the melt for a short time, provides for a high accuracy of measurements.

For example, when said device incorporates an analogue-to-digital converter for converting an analogue signal into a numerical pulse code, having resolution ability 1° C., the maximum error caused by this device in the measuring system does not exceed ±0.5° C.

While the invention has been described in terms of the preferred embodiments, it will be readily understood by those skilled in the art that numerous variations may be made in the digital device for checking a steady-state value of the analogue signal herein described without departing from the invention as set forth in the appended claims.

We claim:

1. A digital device for checking a steady-state value of the analogue signal, comprising an analogue-to-digital converter for converting the analogue signal into a sequence of code pulses the number of which corresponds to an increment of the analogue signal, provided with a first output of code pulses corresponding to a positive increment of the analogue signal and with a second output of code pulses corresponding to a negative increment of the analogue signal;

a clock pulse generator having an output;

a synchronization unit for distribution in time of code and clock pulses, having a first, a second and a third input, an output of synchronized clock pulses, a first output of synchronized code pulses corresponding to a positive increment of the analogue signal and a second output of synchronized code pulses corresponding to a negative increment of the analogue signal;

a time interval discriminator for selecting intervals between two sequence instants of time when a local increment of the analogue signal assumes a predetermined value, having a count input, a first and a second input of initial setting and an information output;

a first and a second threshold counter designed for determining local increments of the analogue signal, each having an add input, a subtract input, an additional subtract input, an input of subtract counting blocking, an overflow output and digit outputs;

a first and a second decoder designed for determining a zero state of the first and the second threshold counters, respectively, each said decoder being provided with inputs and output;

a frequency halver having an input and an output;

a reversible counter for generating a parallel code of calculation result, having an add input, a subtract input, an additional add input, an additional subtract input and digit outputs;

a digital display unit for displaying the calculated result and having an information input and a control input;

a first AND circuit having a first and a second input and an output;

a second and a third AND circuit, each having a first, a second, a third, a fourth inputs and an output;

a fourth AND circuit having a first, a second and a third input and an output;

a fifth, a sixth and a seventh AND circuit, each having a first and a second input and an output;

first, second, and third NOT circuits, each having an input and an output;

said first input of said synchronization unit connected to said first output of said converter of the analogue signal into a numerical pulse code;

said second input of said synchronization unit connected to said second output of said converter of the analogue signal into a numerical pulse code;

said third input of said synchronization unit connected to said output of said clock pulse generator;

said first inputs of said first, second, third and fourth AND circuits and said input of the first NOT circuit connected to said information output of said time interval discriminator;

said second inputs of said first and fifth AND circuits and said input of said frequency halver connected to said output of synchronized clock pulses of said synchronization unit;

said first inputs of said sixth and seventh AND circuits connected to said first and second outputs of said synchronization unit, respectively;

said first input of said fifth AND circuit combined with said second inputs of said sixth and seventh AND circuits and connected to said output of said first NOT circuit;

said add input of said first threshold counter, said subtract input of said second threshold counter and said add input of the reversible counter connected to said output of said sixth AND circuit;

said subtract input of said first threshold counter, said add input of said second threshold counter and said subtract input of said reversible counter connected to said output of said seventh AND circuit;

said additional subtract inputs of said threshold counters, connected to said output of said first AND circuit;

said inputs of a subtract count blocking of said first and second threshold counters, connected to said outputs of the first and the second decoders, respectively;

said inputs of said first and second decoders, connected to said digit outputs of said first and second threshold counters, respectively;

said count input of said time interval discriminator, connected to said output of said fifth AND circuit;

said first and second inputs of initial setting of said time interval discriminator connected to said overflow outputs of said first and second threshold counters respectively;

said second inputs of said second and third AND circuits, connected to said output of said frequency halver;

said third input of said second AND circuit, connected to said output of the second NOT circuit;

said fourth input of said third AND circuit, connected to said output of said third NOT circuit;

said input of said second NOT circuit, said third input of said third AND circuit and said second input of said fourth AND circuit connected to said output of said first decoder;

said fourth input of said second AND circuit, said input of said third NOT circuit, said third input of said fourth AND circuit connected to said output of said second decoder;

said output of said second AND circuit connected to said additional subtract input of said reversible counter;

said output of said third AND circuit, connected to said additional add input of said reversible counter;

said digit outputs of said reversible counter, connected to said information input of said digital display unit;

said output of said fourth AND circuit, connected to said control input of said digital display unit.

* * * * *